United States Patent
Pan et al.

(10) Patent No.: US 11,112,102 B2
(45) Date of Patent: Sep. 7, 2021

(54) LIGHTING FIXTURE

(71) Applicant: QISDA CORPORATION, Taoyuan (TW)

(72) Inventors: Jiung-Cheng Pan, Taoyuan (TW); Zih-Ling Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/868,503

(22) Filed: May 6, 2020

(65) Prior Publication Data

US 2020/0355359 A1    Nov. 12, 2020

(30) Foreign Application Priority Data

May 9, 2019  (CN) .......................... 201910386415.X

(51) Int. Cl.
| | | |
|---|---|---|
| *F21V 23/04* | (2006.01) | |
| *H05B 47/115* | (2020.01) | |
| *H05B 47/105* | (2020.01) | |
| *F21S 6/00* | (2006.01) | |
| *F21V 21/108* | (2006.01) | |
| *F21V 21/30* | (2006.01) | |

(52) U.S. Cl.
CPC ............ *F21V 23/0492* (2013.01); *F21S 6/00* (2013.01); *F21V 21/108* (2013.01); *F21V 21/30* (2013.01); *H05B 47/105* (2020.01); *H05B 47/115* (2020.01)

(58) Field of Classification Search
CPC .... F21V 23/0492; F21V 21/108; F21V 21/30; H05B 47/115; H05B 47/105; F21S 6/00
See application file for complete search history.

(56) References Cited

U.S. PATENT DOCUMENTS

| | | | |
|---|---|---|---|
| 2007/0290621 A1* | 12/2007 | Clark | F21V 29/76 |
| | | | 315/113 |
| 2012/0091903 A1* | 4/2012 | Bembridge | F21V 23/0492 |
| | | | 315/178 |
| 2016/0316543 A1* | 10/2016 | Liu | F21V 21/26 |
| 2017/0023222 A1* | 1/2017 | Lee | F21L 4/02 |
| 2017/0178473 A1* | 6/2017 | Chen | G08B 13/2491 |
| 2017/0322364 A1* | 11/2017 | Girotto | G02B 6/12004 |
| 2017/0332460 A1* | 11/2017 | Sato | F21V 23/0478 |
| 2018/0288856 A1* | 10/2018 | Wang | H05B 47/105 |
| 2019/0011116 A1* | 1/2019 | Nakamura | A61B 1/00006 |
| 2019/0346129 A1* | 11/2019 | Yang | F21V 21/22 |
| 2020/0092965 A1* | 3/2020 | Lange | H05B 45/10 |
| 2020/0170092 A1* | 5/2020 | Lange | F21V 33/0008 |
| 2020/0284417 A1* | 9/2020 | Luo | F21V 23/0492 |

FOREIGN PATENT DOCUMENTS

CN           103438382 A    12/2013

* cited by examiner

*Primary Examiner* — Renan Luque

(57) ABSTRACT

A lighting fixture includes a support frame, a light head, a light source, an angle sensor, and a controller. The light head is pivotally connected to the support frame. The light source is disposed on the light head. The angle sensor is disposed on the light head and configured to sense a rotation angle of the light head. The controller is electrically connected to the light source and the angle sensor. The controller selectively adjusts a light emitting parameter of the light source according to the rotation angle.

5 Claims, 2 Drawing Sheets

LIGHTING FIXTURE

BACKGROUND OF THE INVENTION

1. Field of the Invention

The invention relates to a lighting fixture and, more particularly, to a lighting fixture capable of selectively adjusting a light emitting parameter of a light source according to a rotation angle of a light head.

2. Description of the Prior Art

At present, various lighting fixtures are considered a necessity by a lot of people in their daily lives. When a consumer purchases a lighting fixture, additional function is also a major consideration in addition to appearance. For further illustration, when two lighting fixtures have identical or similar appearance, the consumer usually purchases the lighting fixture with additional function. Therefore, how to improve additional function of the lighting fixture has become a significant design issue.

SUMMARY OF THE INVENTION

An objective of the invention is to provide a lighting fixture capable of selectively adjusting a light emitting parameter of a light source according to a rotation angle of a light head, so as to solve the aforesaid problems.

According to an embodiment of the invention, a lighting fixture comprises a support frame, a light head, a light source, an angle sensor and a controller. The light head is pivotally connected to the support frame. The light source is disposed on the light head. The angle sensor is disposed on the light head and configured to sense a rotation angle of the light head. The controller is electrically connected to the light source and the angle sensor. The controller selectively adjusts a light emitting parameter of the light source according to the rotation angle.

As mentioned in the above, the invention disposes the angle sensor on the light head of the lighting fixture, so as to sense the rotation angle of the light head by the angle sensor. Accordingly, the controller of the lighting fixture can selectively adjust the light emitting parameter (e.g. output power, color temperature, light color, etc.) of the light source according to the rotation angle of the light head, so as to provide different lighting effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
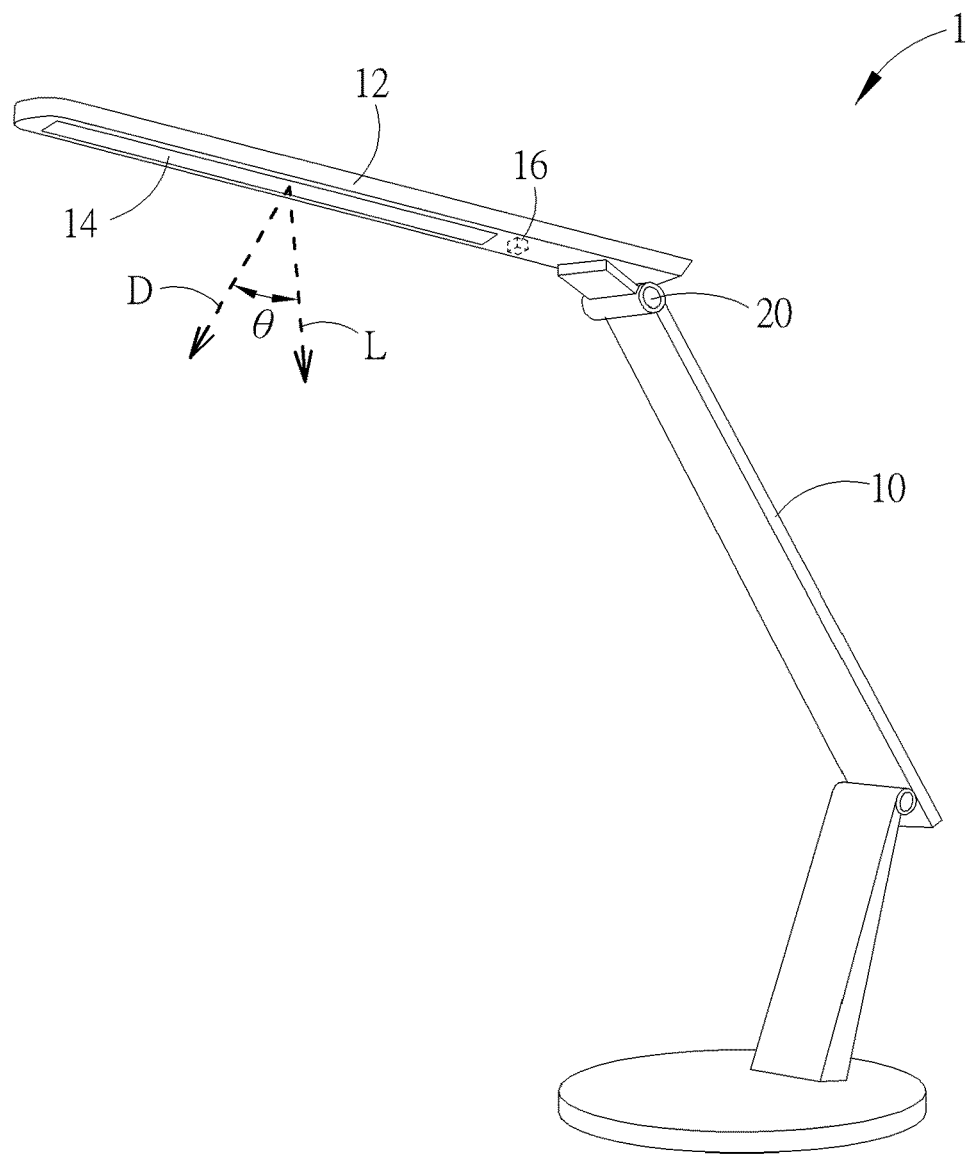
FIG. 1 is a schematic view illustrating a lighting fixture according to an embodiment of the invention.
Figure 2:
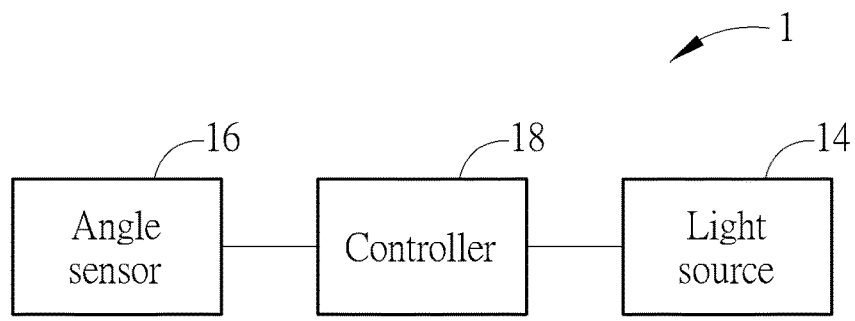
FIG. 2 is a functional block diagram illustrating the lighting fixture shown in FIG. 1.

Referring to FIGS. 1 and 2, FIG. 1 is a schematic view illustrating a lighting fixture 1 according to an embodiment of the invention and FIG. 2 is a functional block diagram illustrating the lighting fixture 1 shown in FIG. 1.

As shown in FIGS. 1 and 2, the lighting fixture 1 comprises a support frame 10, a light head 12, a light source 14, an angle sensor 16 and a controller 18. In this embodiment, the lighting fixture 1 may be a desk lamp, a wall lamp, a standing lamp or other lighting fixtures. The light head 12 may be pivotally connected to the support frame 10 by a pivot 20, such that the light head 12 is capable of rotating with respect to the support frame 10. The light source 14 is disposed on the light head 12. In this embodiment, the light source 14 may be a light emitting diode or other light bulbs/tubes. The angle sensor 16 is disposed on the light head 12, wherein the angle sensor 16 is configured to sense a rotation angle θ of the light head 12. In this embodiment, the angle sensor 16 may be a G sensor or other sensors capable of sensing the rotation angle. Furthermore, the rotation angle θ may be an angle included between a light emitting direction D of the light source 14 and a gravity direction L.

The controller 18 is electrically connected to the light source 14 and the angle sensor 16. In this embodiment, the controller 18 may be disposed on the support frame 10 or the light head 12 according to practical applications. Furthermore, the angle sensor 16 may be electrically connected to a circuit board (not shown) equipped with the controller 18, such that the angle sensor 16 may transmit a signal of the sensed rotation angle to the controller 18. Still further, the controller 18 may adjust a light emitting parameter of the light source 14 through a driving circuit (not shown), so as to provide different lighting effects.

When the lighting fixture 1 is powered on, the controller 18 controls the light source 14 to emit light with a predetermined light emitting parameter through the driving circuit. At the same time, the angle sensor 16 senses the rotation angle θ of the light head 12 and transmits the signal of the sensed rotation angle θ to controller 18. Then, the controller 18 selectively adjusts the light emitting parameter of the light source 14 according to the rotation angle θ. In this embodiment, the light emitting parameter may comprise an output power, a color temperature, a light color, etc. according to practical applications.

For example, when the light emitting parameter is an output power, the controller 18 may determine whether the rotation angle θ of the light head 12 is larger than a predetermined angle first. When the controller 18 determines that the rotation angle θ of the light head 12 is larger than the predetermined angle, the controller 18 may reduce the output power of the light source 14 to reduce the brightness of the light source 14. On the other hand, when the controller 18 determines that the rotation angle θ of the light head 12 is smaller than or equal to the predetermined angle, the controller 18 may maintain the output power of the light source 14 to maintain the brightness of the light source 14.

In general, when the angle included between the light emitting direction D of the light source 14 and the gravity direction L is larger than 45 degrees, the eyes of a user may see the light emitted by the light source 14 directly and feel uncomfortable. Accordingly, the aforesaid predetermined angle may be set as 45 degrees. It should be noted that the aforesaid predetermined angle may also be set as other angles according to practical applications, so the aforesaid predetermined angle is not limited to 45 degrees. In other words, when the rotation angle θ of the light head 12 is larger than the predetermined angle (e.g. 45 degrees), the controller 18 may reduce the output power of the light source 14 (i.e. reduce the brightness of the light source 14) to prevent the eyes of the user from seeing the light emitted by the light source 14 directly and feeling uncomfortable.

In another embodiment, when the light emitting parameter is a color temperature or a light color, the controller 18 may change the color temperature or the light color of the light source 14 according to different rotation angles θ, so as to provide different lighting effects.

Figure 3:
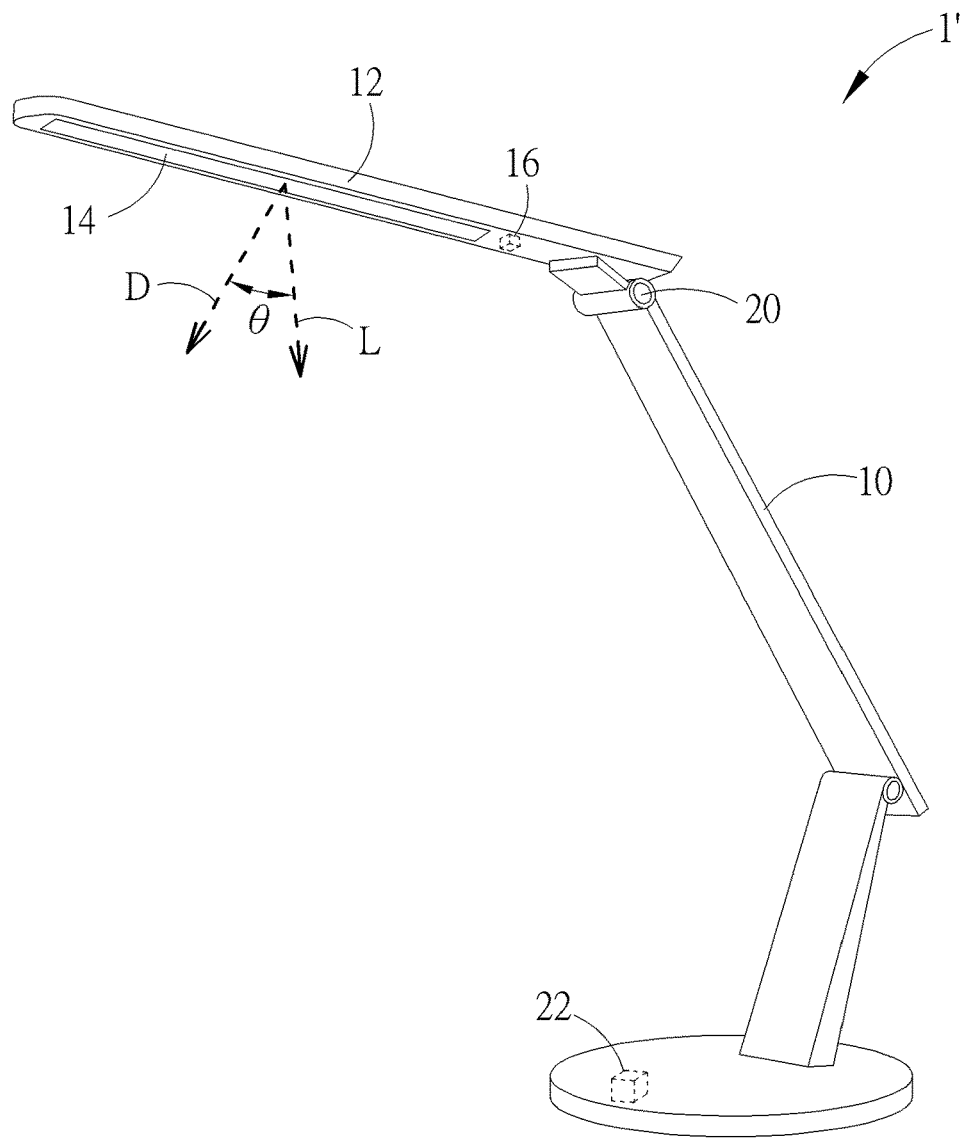
FIG. 3 is a schematic view illustrating a lighting fixture according to another embodiment of the invention.
Figure 4:
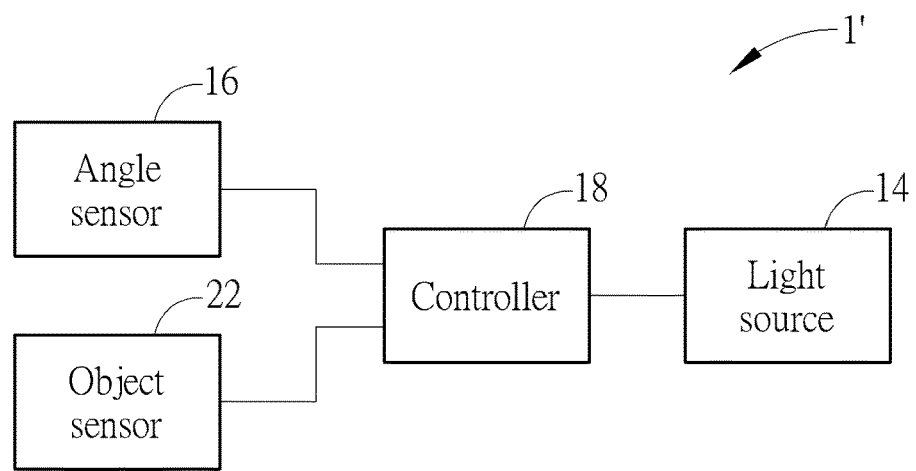
FIG. 4 is a functional block diagram illustrating the lighting fixture shown in FIG. 3.

Referring to FIGS. 3 and 4, FIG. 3 is a schematic view illustrating a lighting fixture 1' according to another embodiment of the invention and FIG. 4 is a functional block diagram illustrating the lighting fixture 1' shown in FIG. 3. The main difference between the lighting fixture 1' and the aforesaid lighting fixture 1 is that the lighting fixture 1' further comprises an object sensor 22. In this embodiment, the object sensor 22 may be disposed on the support frame 10 and the controller 18 is electrically connected to the object sensor 22, as shown in FIGS. 3 and 4. However, in another embodiment, the object sensor 22 may also be disposed on the light head 12. In other words, the object sensor 22 may be disposed on one of the support frame 10 and the light head 12 according to practical applications. Furthermore, the object sensor 22 may be electrically connected to a circuit board (not shown) equipped with the controller 18, such that the object sensor 22 may transmit a sensing signal to the controller 18. In this embodiment, the object sensor 22 may be an infrared sensor, a time-of-flight (ToF) sensor or other sensors capable of sensing an object.

When the lighting fixture 1' is powered on, the controller 18 controls the light source 14 to emit light with a predetermined light emitting parameter through the driving circuit. At the same time, the angle sensor 16 senses the rotation angle θ of the light head 12 and transmits the signal of the sensed rotation angle θ to controller 18. Furthermore, the object sensor 22 senses whether an object (e.g. user) located in front of the lighting fixture 1'. When the object sensor 22 senses an object located in front of the lighting fixture 1', the object sensor 22 outputs a sensing signal to the controller 18. Then, the controller 18 selectively adjusts the light emitting parameter of the light source 14 according to the rotation angle θ and the sensing signal of the object sensor 22. In this embodiment, the light emitting parameter may comprise an output power, a color temperature, a light color, etc. according to practical applications.

For example, when the light emitting parameter is an output power, the controller 18 may determine whether the rotation angle θ of the light head 12 is larger than the aforesaid predetermined angle first. When the controller 18 receives the sensing signal of the object sensor 22 and determines that the rotation angle θ of the light head 12 is larger than the predetermined angle, the controller 18 may reduce the output power of the light source 14 to reduce the brightness of the light source 14. Accordingly, the invention may prevent the eyes of the user located in front of the lighting fixture 1' from seeing the light emitted by the light source 14 directly and feeling uncomfortable.

Furthermore, when the rotation angle θ of the light head 12 is smaller than or equal to the predetermined angle, the eyes of the user will not see the light emitted by the light source 14 directly even of the user is located in front of the lighting fixture 1'. Accordingly, when the controller 18 determines that the rotation angle θ of the light head 12 is smaller than or equal to the predetermined angle, the controller 18 may maintain the output power of the light source 14 to maintain the brightness of the light source 14 no matter whether the user is located in front of the lighting fixture 1'.

Still further, when the object sensor 22 does not sense an object, it means that the user is not located in front of the lighting fixture 1'. At this time, even if the rotation angle θ of the light head 12 is larger than the predetermined angle, it does not affect the user. Accordingly, when the controller 18 does not receive the sensing signal of the object sensor 22, the controller 18 may maintain the output power of the light source 14 to maintain the brightness of the light source 14.

Moreover, when the controller 18 does not receive the sensing signal of the object sensor 22 over a predetermined time period (e.g. ten minutes, half hour, etc.), it means that the lighting fixture 1' is idle (i.e. the user does not use the lighting fixture 1' anymore). At this time, the controller 18 may turn off the light source 14 to save power. When the controller 18 receives the sensing signal of the object sensor 22 again, it means that the user has come back to the front of the lighting fixture 1'. At this time, the controller 18 may turn on the light source 14, such that the user may use the lighting fixture 1' more conveniently. Needless to say, the light source 14 may also be turned on or off by the user manually. It should be note that the aforesaid predetermined time period may be set according to practical applications.

As mentioned in the above, the invention disposes the angle sensor on the light head of the lighting fixture, so as to sense the rotation angle of the light head by the angle sensor. Accordingly, the controller of the lighting fixture can selectively adjust the light emitting parameter (e.g. output power, color temperature, light color, etc.) of the light source according to the rotation angle of the light head, so as to provide different lighting effects. Furthermore, the invention may add the object sensor to the lighting fixture to selectively adjust the light emitting parameter of the light source according to the rotation angle of the light head and the sensing signal of the object sensor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting fixture comprising:
   a support frame;
   a light head pivotally connected to the support frame;
   a light source disposed on the light head;
   a gravity sensor disposed on the light head and configured to sense a rotation angle of the light head, the rotation angle being an angle included between a light emitting direction of the light source and a gravity direction;
   an object sensor disposed on one of the support frame and the light head to determine whether an object is located in front of the lighting fixture; and
   a controller electrically connected to the light source, the object sensor, and the gravity sensor, the controller selectively adjusting a light emitting parameter of the light source according to the rotation angle, wherein the object sensor outputs a sensing signal to the controller when the object sensor determines that the object is located in front of the lighting fixture, the light emitting parameter comprises an output power, the controller determines whether the rotation angle is larger than a predetermined angle, when the controller receives the sensing signal and determines that the rotation angle is larger than the predetermined angle, the controller reduces the output power, and when the controller does not receive the sensing signal, the controller maintains the output power.

2. The lighting fixture of claim 1, wherein when the controller determines that the rotation angle is smaller than or equal to the predetermined angle, the controller maintains the output power.

3. The lighting fixture of claim 1, wherein the predetermined angle is 45 degrees.

4. The lighting fixture of claim 1, wherein when the controller determines that the rotation angle is smaller than or equal to the predetermined angle, the controller maintains the output power.

5. The lighting fixture of claim 1, wherein when the controller does not receive the sensing signal over a predetermined time period, the controller turns off the light source.

* * * * *